United States Patent
Mondal et al.

(10) Patent No.: US 11,698,926 B2
(45) Date of Patent: Jul. 11, 2023

(54) SYSTEMS AND METHODS FOR VIDEO RETRIEVAL AND GROUNDING

(71) Applicants: Arnab Kumar Mondal, Montréal (CA); Deepak Sridhar, Richmond Hill (CA); Niamul Quader, Toronto (CA); Juwei Lu, North York (CA); Peng Dai, Markham (CA); Chao Xing, Montréal (CA)

(72) Inventors: Arnab Kumar Mondal, Montréal (CA); Deepak Sridhar, Richmond Hill (CA); Niamul Quader, Toronto (CA); Juwei Lu, North York (CA); Peng Dai, Markham (CA); Chao Xing, Montréal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/524,862

(22) Filed: Nov. 12, 2021

(65) Prior Publication Data

US 2023/0153352 A1    May 18, 2023

(51) Int. Cl.
*G06F 16/30* (2019.01)
*G06F 16/732* (2019.01)
(Continued)

(52) U.S. Cl.
CPC ........ *G06F 16/7343* (2019.01); *G06F 16/783* (2019.01); *G06N 3/04* (2013.01); *G06V 20/40* (2022.01)

(58) Field of Classification Search
CPC ... G06F 16/7343; G06F 16/783; G06V 20/40; G06N 3/04
See application file for complete search history.

(56) References Cited

U.S. PATENT DOCUMENTS

| 2011/0085734 A1 | 4/2011 | Berg et al. |
| 2012/0008821 A1* | 1/2012 | Sharon ................ G06V 20/46 382/100 |

(Continued)

FOREIGN PATENT DOCUMENTS

| CN | 110598049 A | 12/2019 |
| CN | 111368870 A | * 7/2020 |

(Continued)

OTHER PUBLICATIONS

Article entitled "Cascaded Predication Network via Segment Tree for Temporal Video Grounding", dated Jun. 25, 2021 (Year: 2021).*
Article entitled "Dense Regression Network for Video Grounding", dated Jun. 19, 2020 (Year: 2020).*
Article entitled "SEA: Sentence Encoder Assembly for Video Retrieval by Textual Queries", dated Nov. 24, 2020 (Year: 2020).*

(Continued)

*Primary Examiner* — Mahesh H Dwivedi

(57) ABSTRACT

Methods and systems are described for performing video retrieval together with video grounding. A word-based query for a video is and encoded into a query representation using a trained query encoder. One or more similar video representations are identified, from a plurality of video representations that are similar to the query representation. Each similar video representation represents a respective relevant video. A grounding is generated for each relevant video by forward propagating each respective similar video representation together with the query representation through a trained grounding module. The relevant videos or identifiers of the relevant videos are outputted together with the grounding generated for each relevant video.

20 Claims, 7 Drawing Sheets

(51) Int. Cl.
*G06N 3/04* (2023.01)
*G06F 16/783* (2019.01)
*G06V 20/40* (2022.01)

(56) References Cited

U.S. PATENT DOCUMENTS

2020/0320303 A1* 10/2020 He ..................... G06F 16/7847
2021/0109966 A1    4/2021 Ayush et al.
2021/0256059 A1*  8/2021 Gan ..................... G06N 3/0454

FOREIGN PATENT DOCUMENTS

WO    2017070656 A1    4/2017
WO    2018081751 A1    5/2018

OTHER PUBLICATIONS

Article entitled "Reinforcement Learning for Weakly Supervised Temporal Grounding of Natural Language in Untrimmed Videos", dated Oct. 16, 2020 (Year: 2020).*
Ging et al. COOT: Cooperative Hierarchical Transformer for Video-Text Representation Learning. In NeurIPS 2020. 2020.
Zhang et al. Cross-modal and hierarchical modeling of video and text. In Computer Vision—ECCV Oct. 16, 2018.
Alayrac et al. Self-Supervised MultiModal Versatile Networks. In Neurips Oct. 30, 2020.
Zhang et al. Multi-stage Aggregated Transformer Network for Temporal Language Localization in Videos. CVPR. 2021.
Zhou et al. Grounded Video Description In CVPR 2019.

* cited by examiner

SYSTEMS AND METHODS FOR VIDEO RETRIEVAL AND GROUNDING

TECHNICAL FIELD

The present disclosure relates to systems and methods for video retrieval, in particular systems and methods for performing video retrieval together with temporal and/or spatial video grounding in response to a word-based query.

BACKGROUND

Content-based video retrieval (CBVR) has been of interest, due to its potential for many practical applications. A CBVR system is typically a machine-learning based system that is trained to generate a representation (e.g., feature vector) to represent a video, an image, or a sentence, so that the similarity between two videos, between an image and a video, or between a sentence and a video can be computed based on the similarity (e.g., computed using Euclidean distance or cosine similarity) between their respective representation vectors. In addition to being able to retrieve a video that is relevant to a query, a related task is that of video grounding. Video grounding, when the term is used without qualifiers, typically refers to temporal video grounding. Temporal video grounding refers to the localization of a moment (e.g., identification of a video clip, timestamp, frame, etc.) within an untrimmed video that satisfies a given query. Spatial video grounding refers to the localization of an object (e.g., identifying an object using a bounding box) within a video that is relevant to a given query. Typically, spatial video grounding is performed on a temporally grounded video, and the combination of spatial and temporal video grounding is referred to as spatio-temporal video grounding.

Some existing CBVR methods use self-supervised or supervised representation learning to learn representations of videos, in order to perform tasks such as video retrieval from a text description. A drawback with existing CBVR methods is that typically they are not able to perform any video grounding. Further, existing CBVR methods typically require a long, multi-sentence query in order to correctly retrieve a video. A video may be retrieved to satisfy a query, however it is difficult or impossible to know which section of the video is related to which portion of the query. The result is that existing CBVR methods are limited in their practical applications.

Accordingly, it would be useful to provide a solution that enables CBVR to be used for more practical applications.

SUMMARY

In various examples, the present disclosure describes systems and methods that enables video retrieval together with video grounding (including temporal video grounding, spatial video grounding, or spatio-temporal video grounding), using word-based queries that may include relatively short word-based queries (e.g., single sentence query, single phrase query, single word query, several word long query, etc.) as well as longer word-based queries (e.g., multiple sentence queries, multiple phrase queries, etc.).

The disclosed systems and methods make use of a learned hierarchical representation model to perform the joint task of video retrieval and video grounding (which may be referred to as grounded retrieval). The disclosed systems and methods enable the joint task of video retrieval and video grounding to be performed using a unified network architecture, rather than requiring separate networks for performing each task separately. The ability to perform video grounding together with video retrieval provides the technical advantage that a video can be retrieved in response to a word-based query (which may be a relatively short word-based query, such as a single sentence, a single phrase or a few words) and additionally a clip (or video segment) within the retrieved video can be identified as being related to the query.

The disclosed systems and methods also enable video retrieval and grounding to be performed using video-level representations, rather than clip-level representations. This means that a representation database, which is searched in response to a query, may require fewer storage resources (e.g., fewer memory resources). Further, searching the representation database is also a faster and less computationally intensive operation (i.e., requiring less processing time and power to carry out). Thus, examples of the present disclosure may provide the technical advantage that computing resources, including memory resources and processor resources, can be saved.

In an example aspect, the present disclosure describes a method including: receiving a word-based query for a video; encoding the word-based query into a query representation using a trained query encoder; identifying, from among a plurality of video representations, one or more similar video representations that are similar to the query representation, each similar video representation representing a respective relevant video; generating a grounding for each relevant video by forward propagating each respective similar video representation together with the query representation through a trained grounding module; and outputting one or more identifiers of the one or more relevant videos together with the grounding generated for each relevant video.

In an example of the preceding example aspect of the method, the query representation and the video representation may be in a common representation space, and identifying the one or more similar video representations may include: computing a similarity between the query representation and each video representation stored in a video representation storage; and identifying a defined number of video representations having a highest computed similarity to the query representation.

In an example of any of the preceding example aspects of the method, each of the plurality of video representations may be generated using a trained video representation generator.

In an example of the preceding example aspect of the method, the video representation generator may include a video-processing branch and each video representation may be generated using the video-processing branch by: processing each clip of a video using a clip feature extractor to generate a set of frame features; processing each set of frame features using a clip encoder to generate a respective clip representation, and processing all the sets of frame features using the clip encoder to generate a global video context representation; and processing all clip representations and the global video context representation using a video encoder to generate the video representation.

In an example of the preceding example aspect of the method, the video-processing branch may process the video into two or more clips prior to processing each clip.

In an example of the preceding example aspect of the method, the query encoder may be trained together with the video representation generator using a training dataset of videos having ground-truth multi-sentence annotations. The video representation generator may include a text-processing branch during training. The query encoder may be trained such that a query representation generated from a given sentence in a given annotation matches a high-level sentence representation generated by the text-processing branch of the video representation generator from the given sentence. The query encoder may be further trained such that a query representation generated from a given sentence in a given annotation aligns with a high-level clip representation generated by the video-processing branch of the video representation generator from a given clip corresponding to the given sentence.

In an example of any of the preceding example aspects of the method, the grounding generated for each relevant video may include at least one of: a clip index of a relevant clip in the relevant video; start and end timestamps of the relevant clip; or a bounding box of a relevant object in the relevant video.

In an example of the preceding example aspects of the method, the grounding generated for each relevant video may include the clip index of the relevant clip in the relevant video, and the grounding module may include a classifier network or clip decoder network for predicting the clip index of the relevant clip using the query representation and the similar video representation as inputs.

In an example of the preceding example aspect of the method, the grounding generated for each relevant video may include the start and end timestamps of the relevant clip in the relevant video, and the grounding module may include a regression network for predicting the start and end timestamps of the relevant clip using the query representation and the similar video representation as inputs.

In an example of the preceding example aspect of the method, the word-based query may be a single sentence, multiple sentences, one or more phrases, a single word, or a non-grammatical collection of words.

In some example aspects, the present disclosure describes a system including a processing unit configured to execute instructions to cause the system to: receive a word-based query for a video; encode the word-based query into a query representation using a trained query encoder; identify, from among a plurality of video representations, one or more similar video representations that are similar to the query representation, each similar video representation representing a respective relevant video; generate a grounding for each relevant video by forward propagating each respective similar video representation together with the query representation through a trained grounding module; and output one or more identifiers of the one or more relevant videos together with the grounding generated for each relevant video.

In an example of the preceding example aspect of the system, the query representation and the video representation may be in a common representation space, and identifying the one or more similar video representations may include: computing a similarity between the query representation and each video representation stored in a video representation storage; and identifying a defined number of video representations having a highest computed similarity to the query representation.

In an example of any of the preceding example aspects of the system, each of the plurality of video representations may be generated using a trained video representation generator.

In an example of the preceding example aspect of the system, the video representation generator may include a video-processing branch including: a clip feature extractor configured to generate a set of frame features for each clip of a video; a clip encoder configured to generate a clip representation from the set of frame features of each clip, and to generate a global video context representation from all the sets of frame features; and a video encoder configured to generate the video representation of the video from all clip representations and the global video context representation.

In an example of the preceding example aspect of the system, the query encoder may be trained together with the video representation generator using a training dataset of videos having ground-truth multi-sentence annotations. The video representation generator may include a text-processing branch during training. The query encoder may be trained such that a query representation generated from a given sentence in a given annotation matches a high-level sentence representation generated by the text-processing branch of the video representation generator from the given sentence. The query encoder may be further trained such that a query representation generated from a given sentence in a given annotation aligns with a high-level clip representation generated by the video-processing branch of the video representation generator from a given clip corresponding to the given sentence.

In an example of any of the preceding example aspects of the system, the grounding generated for each relevant video may include at least one of: a clip index of a relevant clip in the relevant video; start and end timestamps of the relevant clip; or a bounding box of a relevant object in the relevant video.

In an example of the preceding example aspect of the system, the grounding generated for each relevant video may include the clip index of the relevant clip in the relevant video, and the grounding module may include a classifier network or clip decoder network for predicting the clip index of the relevant clip using the query representation and the similar video representation as inputs.

In an example of the preceding example aspect of the system, the grounding generated for each relevant video may include the start and end timestamps of the relevant clip in the relevant video, and the grounding module may include a regression network for predicting the start and end timestamps of the relevant clip using the query representation and the similar video representation as inputs.

In an example of any of the preceding example aspects of the system, the word-based query may be a single sentence, multiple sentences, one or more phrases, a single word, or a non-grammatical collection of words.

In some example aspects, the present disclosure describes a computer readable medium having instructions encoded thereon. The instructions, when executed by a processing unit of a system, cause the system to: receive a word-based query for a video; encode the word-based query into a query representation using a trained query encoder; identify, from among a plurality of video representations, one or more similar video representations that are similar to the query representation, each similar video representation representing a respective relevant video; generate a grounding for each relevant video by forward propagating each respective similar video representation together with the query representation through a trained grounding module; and output one or more identifiers of the one or more relevant videos together with the grounding generated for each relevant video.

In an example of the preceding example aspect of the computer readable medium, the instructions, when executed by a processing unit of a system, may cause the system to perform any of the preceding example aspects of the method.

In another example aspect, the present disclosure describes a computer program including instructions which, when the program is executed by a computer, cause the computer to carry out any of the preceding example aspects of the method.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

Conventionally, videos may be annotated with text descriptions that include multiple sentences, where each sentence corresponds to a text description of a single clip in the video. Many existing methods for video retrieval tasks typically require similarly long text descriptions or multi-sentence annotations to be used as queries, in order to achieve an acceptable level of performance (e.g., able to retrieve the correct video). Importantly, many existing methods for video retrieval are not successful or able to perform video grounding. The result is that such methods are not suited to practical application.

Video grounding is an important component of a successful video retrieval system. A user who inputs a word-based query for a video (e.g., a query that contains one or more words that may or may not have grammatical structure, for example a single sentence) typically would like to receive retrieved results that not only indicates the videos relevant to the query, but also the particular sections of the videos that are relevant to the query. In the present disclosure, a section of a video may be referred to as a video clip or simply clip. Other terms that may be used to refer to a section of a video may be a video segment, video portion, sub-video, or frame sequence, among others.

There are existing methods that successfully perform the video grounding task (e.g., given a sentence, find the relevant section of the video or find a relevant object in a particular frame of the video). However, such methods typically require the video that is being grounded to be known (i.e., is unable to perform the video retrieval task).

Some methods have been explored for retrieving a clip from a video using a short (e.g., single sentence) query. However, such methods typically require representations (e.g., feature vectors) to be stored for each clip of each video. This means that such methods are inefficient both in terms memory resources required to store representations and the runtime required to execute the algorithm during inference. Accordingly, such methods are not suitable for practical application.

In various examples, the present disclosure describes systems and methods that may be implemented in a content-based video retrieval (CBVR) system, which enables CBVR system to identify not only the videos that are relevant to a word-based query but also an indication of the clip within each video that is relevant to the query. Examples of the present disclosure use a hierarchical representing learning model to learn video-level representations (i.e., one representation per video), which may be stored and searched. The need to store clip-level representations (i.e., one representation per clip; thus multiple clip-level representations per video) and the associated inefficiencies are thus avoided.

Figure 1:
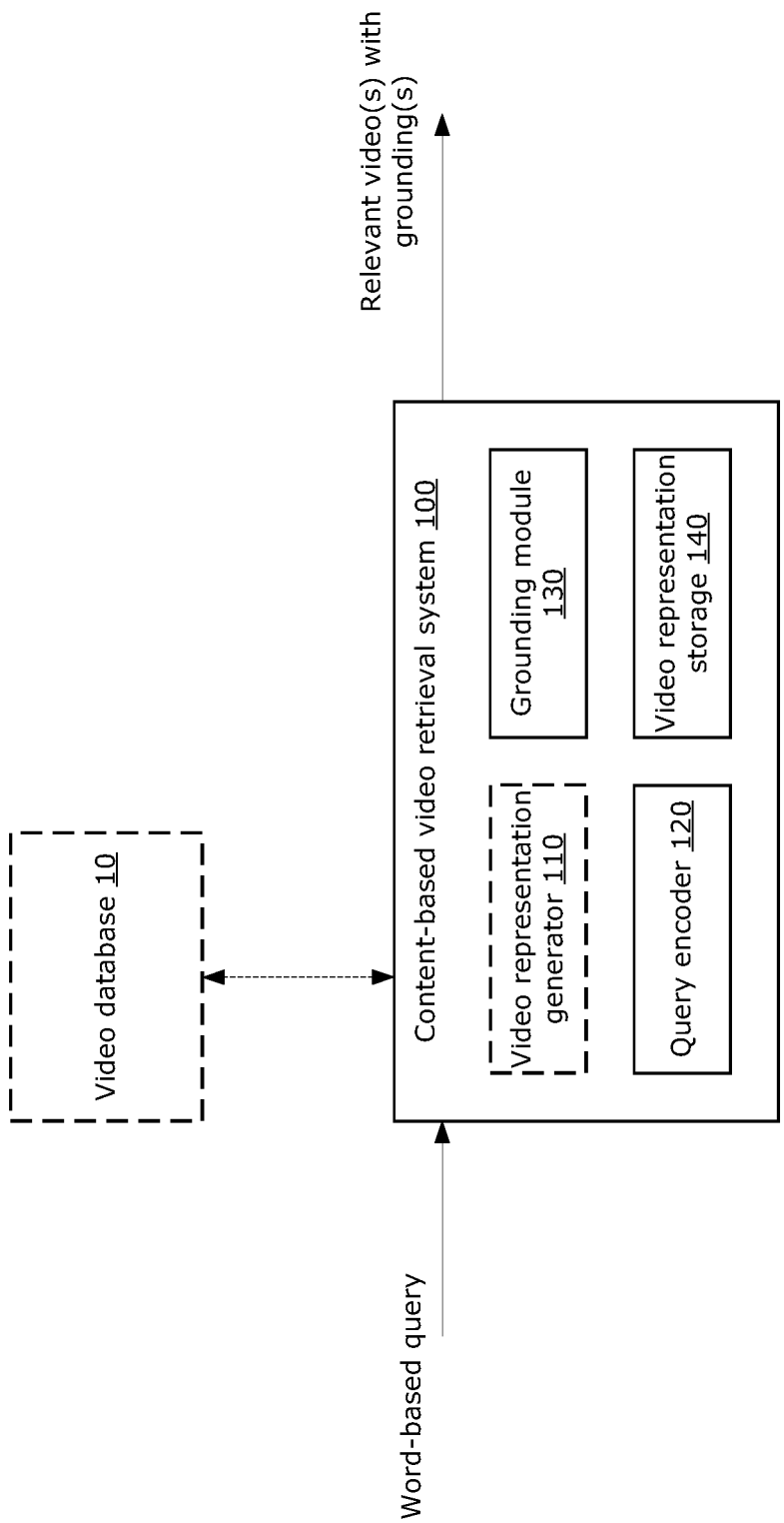
FIG. 1 is a block diagram illustrating an example CBVR system, in accordance with examples of the present disclosure.

FIG. 1 is a block diagram illustrating an example CBVR system 100, which may be implemented using systems and methods disclosed herein. The CBVR system 100 may be implemented in a single physical machine or device (e.g., implemented as a single computing device, such as a single workstation, single server, etc.), or may be implemented using a plurality of physical machines or devices (e.g., implemented as a server cluster). For example, the CBVR system 100 may be implemented as a virtual machine or a cloud-based service (e.g., implemented using a cloud computing platform providing a virtualized pool of computing resources).

The CBVR system 100 may receive a word-based query for a video, for example a query sentence, a multi-sentence query, a query phrase, a multi-phrase query, a query word or a multi-word query. In the present disclosure, the word-based query refers to a text query that includes one or more words, which may or may not have grammatical structure (e.g., including a noun and a verb), and is not necessarily limited to a grammatically-correct sentence or sentences. For example, a word-based query may be "A lady walks through the doorway", "lady walk through doorway", "lady doorway", etc. Examples of the present disclosure may enable video retrieval using a word-based query that contains a fewer number of words (e.g., fewer than 10 words, or fewer than 20 words) than a conventional multi-sentence annotation for a video (e.g., conventional video annotations that may include greater than 20 words). The word-based query may be received by the CBVR system 100 over a wireless communication network (e.g., in the scenario where the CBVR system 100 provides a cloud-based service), for example. The word-based query may be provided to the CBVR system 100 from various electronic devices, including end user devices (e.g., smartphones, desktop devices, workstations, etc.).

In response to the received word-based query, the CBVR system 100 returns (e.g., communicates back to the electronic device) a set of one or more videos that are relevant to the query (also referred to as "relevant video(s)"). The set of relevant video(s) may include the actual video(s) (i.e., data files) or may include the identifier(s) or reference(s) that may be used to retrieve the video(s). Notably, the response to the received word-based query (also referred to as the "query response") includes, for each relevant video, a grounding such as an identifier of the relevant clip(s) (i.e., the clip(s) that are relevant to the query) within the relevant video.

In some examples, the CBVR system 100 may be implemented by (i.e., executed on) the same device that provides the word-based query. For example, user device (e.g., smartphone, desktop device, workstation, etc.) may receive a word-based query as input from a user, and the word-based query may be passed internally (i.e., within the same device) to the CBVR system 100 that is executed by the same user device. The CBVR system 100 may then output the relevant video(s) and grounding(s) to be displayed to the user on the user device, for example. In some examples, different components of the CBVR system 100 may be implemented on separate devices. For example, less complex components and/or components that require less processing power (e.g., components that have few or no neural network layers) may be executed on a lower-powered user device, while more complex components and/or components that require more processing power (e.g., components that have deep neural network layers) may be executed separately on a more powerful network server.

In some examples, the CBVR system 100 may be in communication (e.g., over a wireless communication network) with a video database 10 storing retrievable videos. Videos stored in the video database 10 may or may not be annotated with multi-sentence text descriptions. The CBVR system 100 may communicate with the video database 10 to retrieve one or more videos that are relevant to a received word-based query, and provide the retrieved video(s) as part of a response to the query. In other examples, the CBVR system 100 may not be in direct communication with the video database 10. Instead, the CBVR system 100 may, in response to a received word-based query, provide an identifier or reference for each of the video(s) that are relevant to the query, where the identifier or reference may be used by another electronic device to retrieve the desired video(s) from the video database 10. Other arrangements may also be possible within the scope of the present disclosure.

The CBVR system 100 in this example includes subsystems including an optional video representation generator 110, a query encoder 120, a grounding module 130 and a video representation storage 140. As will be discussed further below, the video representation generator 110 may be used by the CBVR system 100 during training (e.g., to learn the parameters for the query encoder 120 and the grounding module 130) and may be discarded, inactive or omitted from the CBVR system 100 in the inference phase. In some examples, the video representation generator 110 may be maintained as an active part of the CBVR system 100 during the inference phase, for example to generate video representations for videos that are added to the video database 10 after the training phase is complete. In the example shown, the video representation storage 140 is an internal storage (e.g., internal memory or mass storage unit) of the CBVR system 100. In other examples, the video representation storage 140 may be an external storage (e.g., external database or external memory) that is accessible by the CBVR system 100.

Although FIG. 1 illustrates certain subsystems of the CBVR system 100, it should be understood that this is not intended to be limiting, and the CBVR system 100 may include greater or fewer number of subsystems (and may not include any subsystem at all). Functions described as being performed by a particular subsystem may be performed by a different subsystem, and/or may be a function of the overall CBVR system 100. Operation of the CBVR system 100 will be discussed in greater detail further below.

Figure 2:
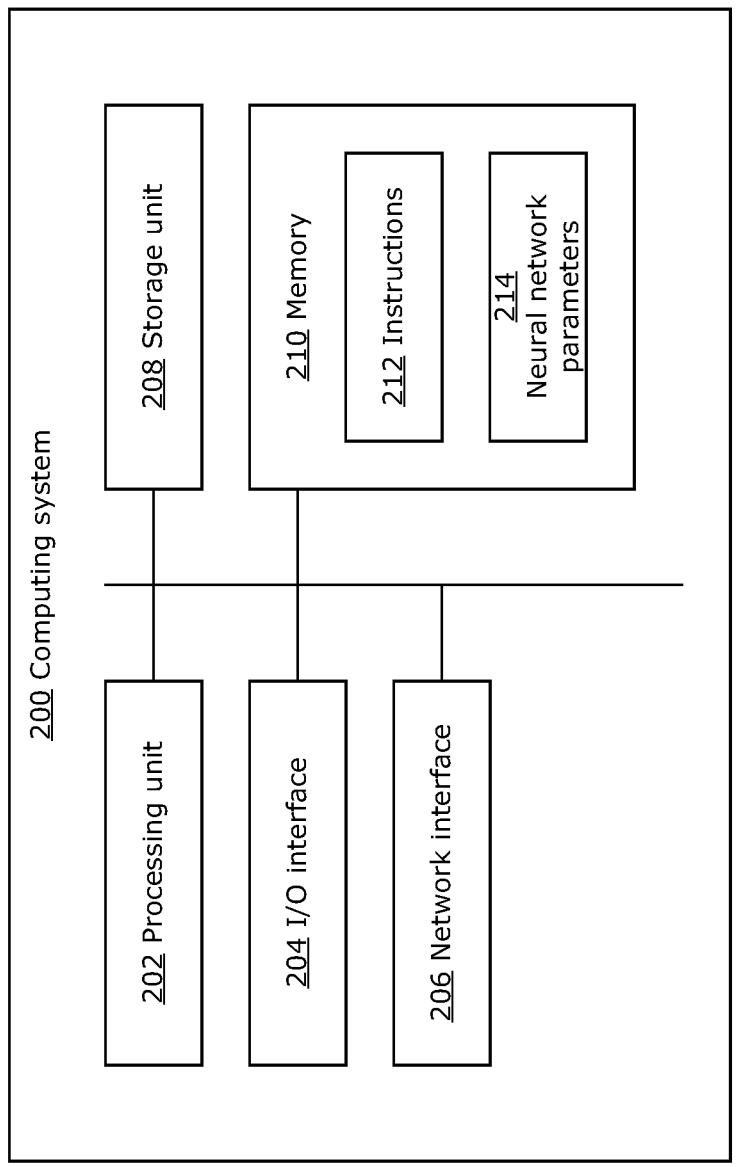
FIG. 2 is a block diagram illustrating an example computing system that may be used to implement a CBVR system, in accordance with examples of the present disclosure.

FIG. 2 is a block diagram illustrating a simplified example computing system 200 that may be used for implementing the CBVR system 100, in some embodiments. The computing system 200 may represent a server, for example. As discussed previously, the CBVR system 100 may be implemented in other hardware configurations, including implementation using a plurality of computing systems (e.g., a cloud-based system accessing a virtual resource pool). Although FIG. 2 shows a single instance of each component, there may be multiple instances of each component in the computing system 200. The computing system 200 may be used to execute instructions for training a neural network and/or for executing a trained neural network, as discussed further below.

In this example, the computing system 200 includes at least one processing unit 202, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 200 may include an input/output (I/O) interface 204, which may enable interfacing with an input device and/or output device (not shown).

The computing system 100 may include a network interface 206 for wired or wireless communication with other computing systems (e.g., the video database 10, an electronic device providing a word-based query, an external video representation storage 140, etc.). The network interface 206 may include wired links (e.g., Ethernet cable) and/or wireless links (e.g., one or more antennas) for intra-network and/or inter-network communications. The network interface 206 may also enable the computing system 200 to communicate a query response to another computing system (e.g., to the electronic device that provided the query).

The computing system 200 may include a storage unit 208, which may include a mass storage unit such as a solid state drive, a hard disk drive, a magnetic disk drive and/or an optical disk drive. In some examples, the video representation storage 140 may be implemented using the storage unit 208.

The computing system 200 may include a memory 210, which may include a volatile or non-volatile memory (e.g., a flash memory, a random access memory (RAM), and/or a read-only memory (ROM)). The non-transitory memory 210 may store instructions 212 for execution by the processing unit 202, such as to carry out example embodiments described in the present disclosure. For example, the memory 210 may store instructions 212 for implementing the CBVR system 100 as well as any of the methods disclosed herein. The memory 210 may also store neural network parameters 214, which may be parameters learned from training a neural network, as described further below. The memory 210 may include other software instructions, such as for implementing an operating system and other applications/functions.

The computing system 200 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Reference is again made to FIG. 1. Some subsystems of the CBVR system 100 can be implemented using neural networks, which are trained using machine learning techniques. For example, the video representation generator 110 may be implemented using a hierarchical representation learning model, the query encoder 120 may be implemented using another neural network (e.g., any neural network designed to process sequence inputs, such as a transformer, a long-short-term memory (LSTM) or a recurrent neural network (RNN), among others), and the grounding module 130 may be implemented using another neural network. Prior to application of the CBVR system 100 (i.e., prior to use of the CBVR system 100 to retrieve videos in response to a query), the CBVR system 100 may be trained using machine learning techniques.

The video representation generator 110, query encoder 120 and grounding module 130 are trained together, such that each subsystem is trained to perform a respective machine learning task, namely: the video representation generator 110 is trained to generate video representations from video annotations; query encoder 120 is trained to encode a word-based query into a query representation that is in the same, common representation space (e.g., multi-dimensional vector space) as the video representations; and the grounding module 130 is trained to perform a grounding task (i.e., output a grounding). The representation space that is common to both the video representations and the query representations may be referred to as a video-text representation space. The grounding task may be, in the case where the CBVR system 100 is designed to provide video retrieval with temporal video grounding, to output an identifier (e.g., clip index or clip timestamp(s) indicating start and optionally end of a clip) of the relevant clip within a relevant video, given the query representation and the video representation of a relevant video. If the CBVR system 100 is designed to provide video retrieval with spatial video grounding, the grounding task may be to output a bounding box of a relevant object within a relevant video, given the query representation and the video representation of a relevant video. If the CBVR system 100 is designed to provide video retrieval with spatio-temporal video grounding, the grounding task may be to output an identifier of the relevant clip within a relevant video and also output a bounding box of a relevant object within the relevant clip. It may be noted that there may one or more relevant vides for a given query, and there may be one or more relevant clips in a relevant video. A predefined relevancy threshold (e.g., a minimum relevancy score or minimum similarity metric) may be used and only the relevant clips that are higher than the relevancy threshold may be included in the output. Similarly, there may be multiple relevant objects for a given query, and only those objects that satisfy a predefined relevancy threshold may be included in the output. For simplicity, examples are described herein where the CBVR system 100 provides video retrieval with temporal video grounding, however it should be understood that this is not intended to be limiting. Examples that have been described for performing video retrieval with temporal video grounding may be adapted for video retrieval with spatial video grounding or spatio-temporal video grounding.

As will be described above, the video representation generator 110 has a hierarchical joint video-text representation learning architecture that is trained to generate a video representation from a video annotation. Together with training the video representation generator 110, the query encoder 120 is trained to generate query representations that capture sentence features and capture the context of the sentence with respect to a multi-sentence description. Additionally, the grounding module 130 is trained to perform the grounding task, using a video representation and a query representation as input.

Figure 3A:
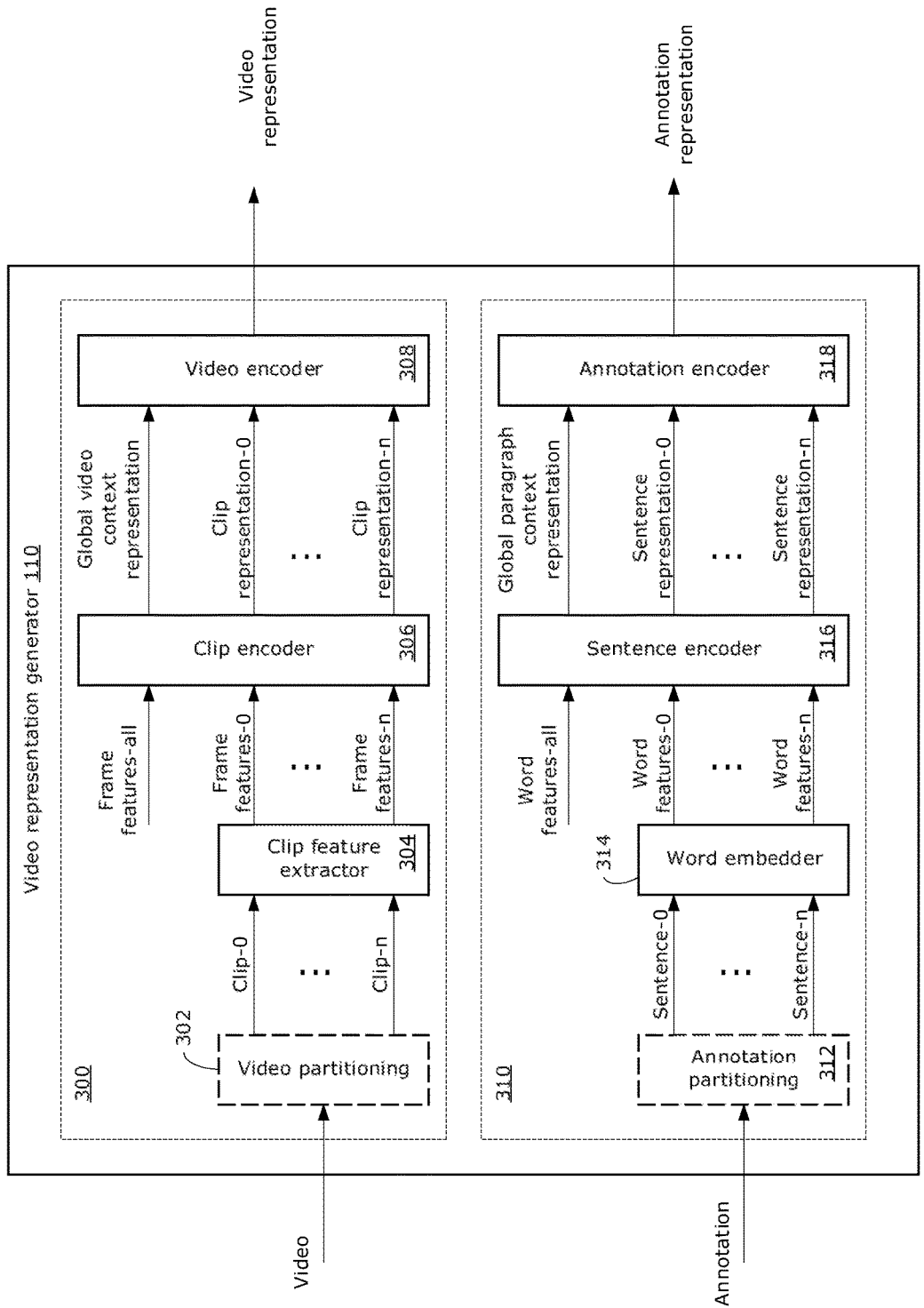
FIGS. 3A-3D are block diagrams illustrating example subsystems of the CBVR system, in accordance with examples of the present disclosure.
Figure 3B:
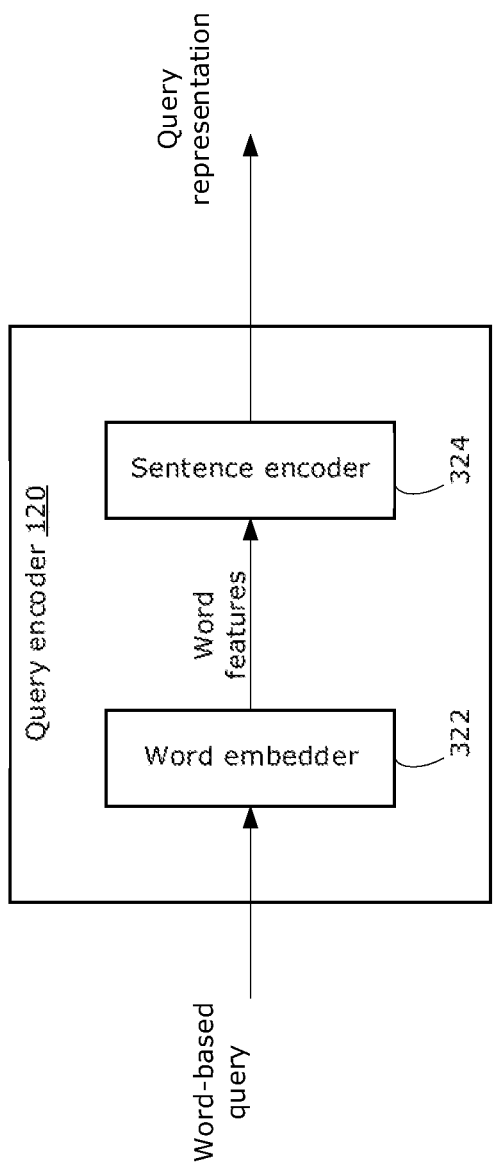
Figure 3C:
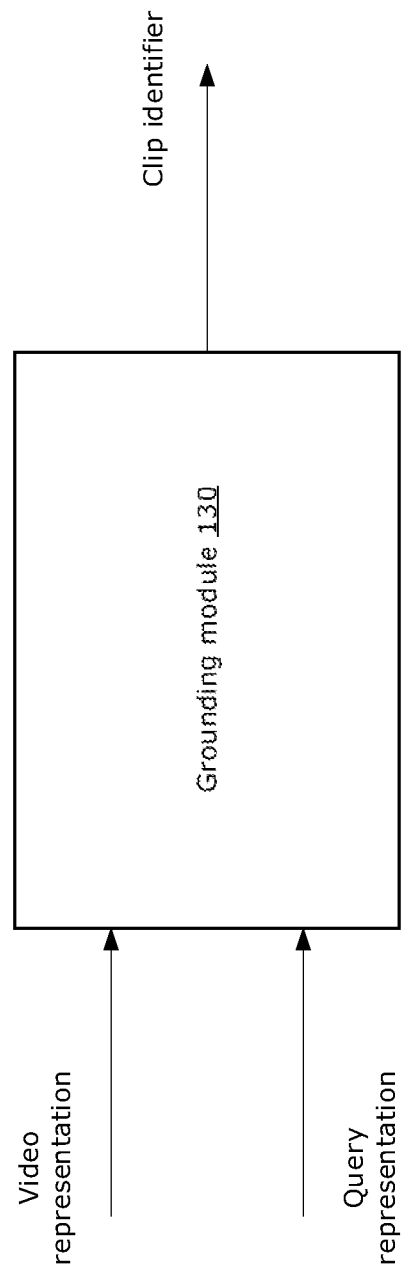

FIGS. 3A-3C are block diagrams illustrating details of example implementations of the video representation generator 110, the query encoder 120 and the grounding module 130. Different embodiments of the video representation generator 110, the query encoder 120 and the grounding module 130 may be used, for example depending on the design of the neural network architecture and/or loss function. For simplicity, the following discussion describes examples for performing video retrieval with temporal video grounding, however this is not intended to be limiting.

In the training phase, the CBVR system 100 may be trained end-to-end, meaning that the video representation generator 110, the query encoder 120 and the grounding module 130 may all be trained together (rather than each subsystem 110, 120, 130 being trained separately or sequentially). In some examples, the video representation generator 110 and the query encoder 120 are trained together, while the grounding module 130 may be trained separately or sequentially. Training of the CBVR system 100 may be performed using a training dataset that includes annotated videos (i.e., videos that have corresponding text descriptions). For example, the training dataset may be a set of videos stored in the video database 10 that have been annotated (e.g., manually annotated or machine annotated). Each video has a multi-sentence text annotation, which may be referred to as a paragraph description. Each sentence in the paragraph description corresponds to a respective clip in the video and is associated with a respective timestamp of each clip (e.g., a start timestamp).

FIG. 3A illustrates an example of the video representation generator 110 that may be used during the training phase. The video representation generator 110 may include a video-processing branch 300 that generates a video representation from an input video and a text-processing branch 310 that generates an annotation representation from a paragraph (i.e., multi-sentence) annotation. In the inference phase, the video representation generator 110 may be inactive or omitted. Alternatively, in the inference phase, the video-processing branch 300 of the video representation generator 110 may be maintained and may be executed (e.g., to generate a video representation for a new video added to the video database 10), and the text-processing branch 310 of the video representation generator 110 may be inactive or omitted. The video-processing branch 300 and the text-processing branch 310 have similar neural network architecture in this example. The video-processing branch 300 is described first.

Optionally, the video-processing branch 300 may include a video partitioning module 302 that partitions the video into clips (shown as clip-0 to clip-n) according to the annotated timestamps (where each pair of start and end timestamps correspond to a respective sentence in the annotation). In some examples, the partitioning into clips may be performed by a preprocessing module that is external to the video representation generator 110.

The clips are each processed by a clip feature extractor 304 to output a respective set of frame features (shown as frame features-0 to frame features-n). The clip feature extractor 304 may be a pre-trained feature extraction neural network (e.g., a pre-trained deep CNN, which may be a 3D CNN) that takes as input a moving window of a defined number of video frames (which may be referred to as a mini-clip) of the clip and outputs a frame feature representation (e.g., feature vector) for each mini-clip. The moving window is moved by a defined stride. The number of frame feature representations (or simply frame features) extracted for a given clip depends on the size of the moving window and the stride used. For example, if a given clip is 20 frames in length, the size of the moving window is 5 frames and the stride is 2 frames, then a set of 8 frame features will be generated for the given clip. The frame features may be padded (e.g., padded with zeros) to a fixed maximum length, to ensure that there is an equal number of features to be processed across all videos.

The set of frame features of each clip is processed by a clip encoder 306 to output a respective clip representation. For example, frame features-0 of clip-0 is processed by the clip encoder 306 to output clip representation-0. Each clip representation may be a vector, and clip representation-0 to clip representation-n may all have the same vector length. In addition to clip representations-0 to clip representations-n corresponding to clips-0 to clips-n, all frame features generated from the entire video (shown as frame features-all) are also inputted to the clip encoder 306 to output a global video context representation. The global video context representation also has the same vector length as clip representations-0 to clip representations-n. Generation of the global video context representation enables encoding of information pertinent to the global context of the video. The clip encoder 306 may be any suitable neural network that is designed to process a sequence (in this case, a sequence of frame features that represents a sequence of frames) and aggregate the result. For example, the clip encoder 306 may be implemented using a temporal transformer and an attention based aggregation layer. For example, the clip encoder 306 may be implemented using any standard transformer, or variants of the transformer such as Sparse Transformer or Transformer-XL (e.g., as described by Vaswani et al. "Attention is All You Need", arXiv: 1706.03762; Child et al. "Generating Long Sequences with Sparse Transformers", arXiv: 1904.10509; or Dai et al. "Transformer-XL: Attentive Language Models Beyond a Fixed-Length Context", arXiv: 1901.02860). Attention-based aggregation may be performed using standard attention-based aggregation (e.g., as described by Ging et al. "COOT: Cooperative Hierarchical Transformer for Video-Text Representation Learning", arXiv: 2011.00597).

The clip representations-0 to clip representations-n and the global video context representation are processed by a video encoder 308 to output a video representation (e.g., a feature vector). The video encoder 308 may be any suitable neural network that is designed to compute a cross-attention feature between the global video context representation and the clip representations-0 to clip representations-n. The video encoder 308 may be further designed to compute self-attention using all the clip representations-0 to clip representations-n and then perform averaging pooling to obtain a pooled feature for all the clips. The pooled feature may then be concatenated with the cross-attention feature to output the video representation.

The text-processing branch 310 may be similar to the video-processing branch 300, with the difference that the text-processing branch 310 is designed to process textual input instead of video frames.

Optionally, the text-processing branch 310 may include an annotation partitioning module 312 that partitions the annotation paragraph into sentences (shown as sentence-0 to sentence-n) using any suitable text parsing algorithm. In some examples, the partitioning into sentences may be performed by a preprocessing module that is external to the video representation generator 110. It should be noted that the index of each sentence corresponds to the index of the corresponding clip. That is, sentence-k corresponds to (i.e., is a text description of) clip-k. In some examples, the partitioning of the annotation paragraph into sentences and the partitioning of the video into clips that each correspond to a respective sentence in the annotation may be performed together by a single partitioning module.

The sentences are each processed by a word embedder 314 to output a respective set of word features (shown as word features-0 to word features-n). The word embedder 314 be a pre-trained word embedding neural network. The word embedder 314 may also include a pre-trained bidirectional encoder representations from transformers (BERT) model that fine-tunes the word features-0 to -n to capture the context of the sentences.

The set of word features of each sentence is processed by a sentence encoder 316 to output a respective sentence representation. For example, word features-0 of sentence-0 is processed by the sentence encoder 316 to output sentence representation-0. Each sentence representation is a vector, and sentence representation-0 to sentence representation-n all have the same vector length. In addition to sentence representations-0 to -n corresponding to sentences-0 to -n, all word features generated from all sentences (shown as word features-all) are also inputted to the sentence encoder 316 to output a global paragraph context representation. The global paragraph context representation may also have the same vector length as sentence representations-0 to -n. Generation of the global paragraph context representation enables encoding of information pertinent to the global context of the annotation. The sentence encoder 316 may be designed similarly to the clip encoder 306 described above.

The sentence representations-0 to -n and the global paragraph context representation are processed by an annotation encoder 318 to output an annotation representation (e.g., a feature vector). The annotation encoder 318 may be designed similarly to the video encoder 308 described above. Notably, the annotation representation outputted by the text-processing branch 310 should be in the same, common representation space (e.g., multi-dimensional vector space) as the video representation outputted by the video-processing branch 300 (i.e., the annotation representation and the video representation are in the common representation space, which may be referred to as the video-text representation space).

The clip feature extractor 304 and the word embedder 314 may be pre-trained neural networks. The clip encoder 306, video encoder 308, sentence encoder 316 and annotation encoder 318 may be trained in the training phase, as discussed further below.

FIG. 3B illustrates an example of the query encoder 120. The query encoder 120 includes a pre-trained word embedder 322 and a sentence encoder 324.

The word embedder 322 of the query encoder 120 may be designed similarly to the word embedder 314 of the video representation generator 110 described above. The sentence encoder 324 may be any suitable neural network that is designed to process temporal information (e.g., a temporal transformer) with self-attention and attention-based aggregation. For example, the sentence encoder 324 may be implemented using any standard transformer, or variants of the transformer such as Sparse Transformer or Transformer-XL. Attention-based aggregation may be performed using standard attention-based aggregation, or may be based on a unique token (e.g., {CLS} token) (e.g., as described by Sun et al. "VideoBERT: A joint Model for Video and Language Representation Learning", arXiv: 1904.01766).

The query encoder 120 may be designed and trained to generate a query representation that is also in the same, common representation space (e.g., multi-dimensional vector space, which may be referred to as the video-text representation space) as the video representation. In particular, the query encoder 120 is trained together with the video representation generator 110 (discussed further below) such that the query representation generated by the query encoder 120 mimics the high-level sentence representation that is generated by the text-processing branch 310 of the video representation generator 110 when only one sentence in the annotation is activated (discussed further below). In this way, the query encoder 120 is trained to capture the implied global context (sometimes referred to a "hallucinating" the context) of a word-based query, despite the word-based query being provided outside of the context of a multi-sentence, paragraph annotation.

FIG. 3C illustrates an example of the grounding module 130. The grounding module 130 accepts as inputs the query representation and the video representation that is similar to the query representation. Similarity between the query representation and the video representation may be computed by computing the cosine similarity (or some other similarity measurement) between the query representation and the video representation. The grounding module 130 processes these inputs and outputs a grounding. The outputted grounding may be a coarse grounding and/or a fine grounding. The type and format of the grounding may depend on whether temporal, spatial or spatio-temporal video grounding is provided. For temporal grounding, the grounding outputted by the grounding module 130 may be a clip identifier, which may be a coarse identifier (e.g., a predicted clip index) and/or a fine identifier (e.g., predicted start and end timestamps). For spatial grounding, the grounding outputted by the grounding module 130 may be an object identifier, which may be a coarse identifier (e.g., a predicted object index) and/or a fine identifier (e.g., a predicted bounding box). For spatio-temporal grounding, the grounding outputted by the grounding module 130 may include both a clip identifier (which may be a coarse identifier and/or fine identifier) and an object identifier (which may be a coarse identifier and/or fine identifier).

The grounding module 130 may be a clip decoder network that is designed and trained to reconstruct clip representations from the video representation. The reconstructed clip representations are then compared with the query representation to identify the most closely matched clip representation (e.g., based on vector similarity). The clip corresponding to the clip representation that most matches the query representation is identified (e.g., identified by the clip index) as the relevant clip. Cross-attention may also be computed between the reconstructed clip representation and the query representation to obtain cross-attention features, which are processed by a linear layer of the network to obtain predicted start and end timestamps.

In another example, the grounding module 130 may be a clip classifier network. For example, the clip classifier network may be implemented using a multilayer perceptron (MLP) network, which takes the video representation and query representation as inputs and outputs softmax values over all possible clip indexes. The clip index with the highest probability is outputted as the predicted relevant clip. The features from the penultimate layer (i.e., the layer prior to the softmax output layer) may be processed to using a regression network to predict the start and end timestamps.

Figure 4:
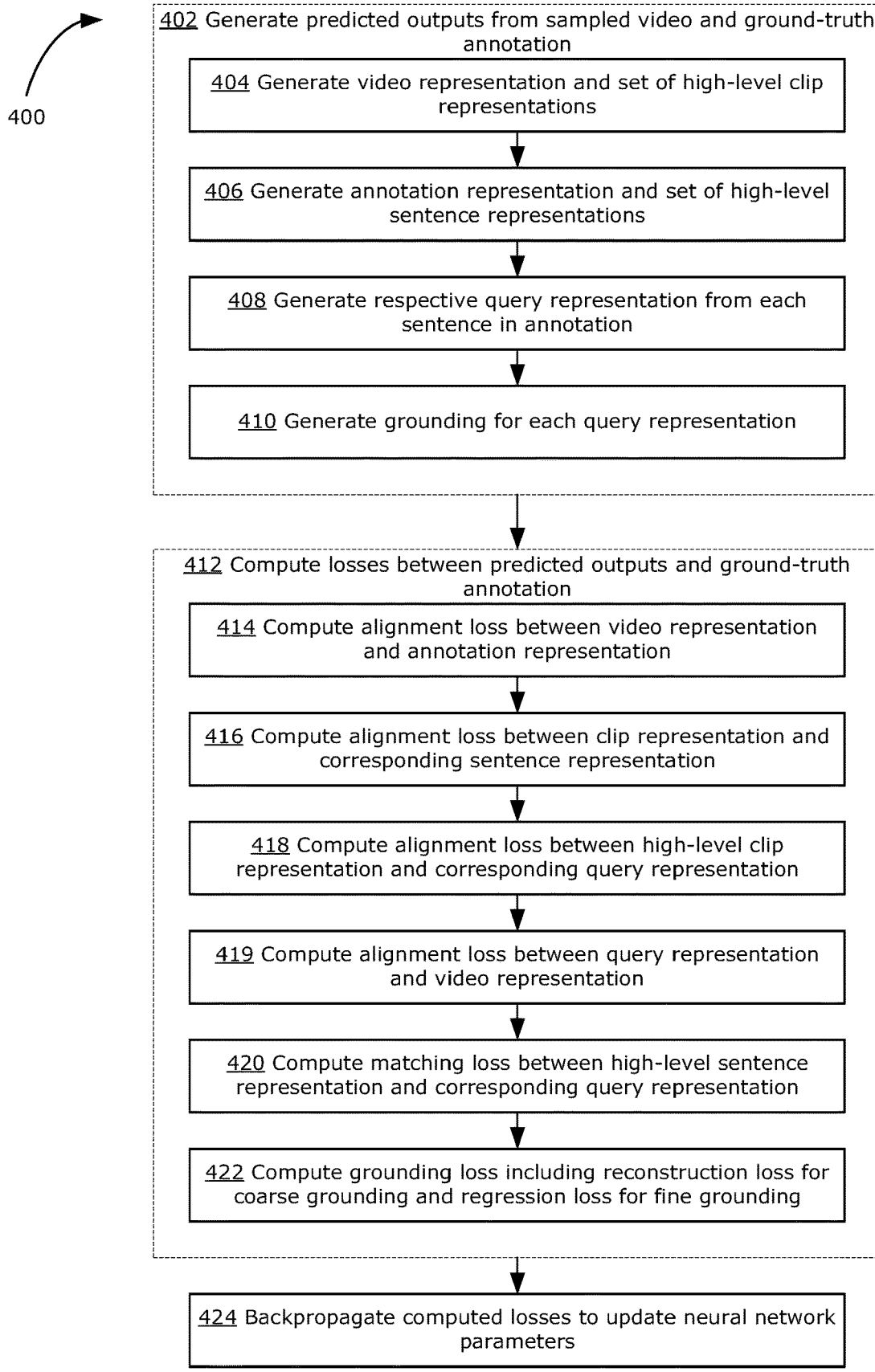
FIG. 4 is a flowchart illustrating an example method for training a CBVR system, in accordance with examples of the present disclosure.

FIG. 4 is a flowchart illustrating an example method 400 for training the CBVR system 100. The CBVR system 100 may be trained end-to-end, meaning that the subsystems 110, 120 and 130 may be trained together, rather than separately or sequentially, and may be trained using the same training dataset (e.g., using the training dataset of annotated videos as described above). The method 400 may be performed by any computing system (e.g., the computing system 200) that is configured for performing computations required for updating the parameters (e.g., weight values) of a neural network and for executing a neural network.

For simplicity, the method 400 is described for a round of training using one annotated video sampled from the training dataset. It should be understood that training of the CBVR system 100 may involve multiple rounds of training and batch-wise sampling may be used (i.e., a batch of annotated videos may be sampled from the training dataset at one time, rather than sampling one annotated video at a time). Training may be repeated until a convergence condition is satisfied (e.g., a maximum number of rounds of training has been reached, a maximum number of annotated videos have been sampled, all annotated videos in the training dataset have been sampled and/or the neural network parameters converge).

At 402, components of the CBVR system 100 generate predicted outputs from the sampled video and its ground-truth annotation. As previously described, each video in the training dataset is annotated with a ground-truth annotation including a multi-sentence text description of the video (where each sentence corresponds to a clip of the video) and clip timestamps corresponding to each sentence of the annotation. The generated outputs include a generated video representation and a set of high-level clip representations; a generated annotation representation and a set of high-level sentence representations; query representations that each correspond to a respective sentence of the annotation; and groundings for each query representation. Steps 404-410 may be performed to generate these outputs.

At 404, the sampled video is processed (e.g., using the video-processing branch 300 of the video representation generator 110) to generate a video representation (e.g., a feature vector). Additionally, a set of high-level clip representations is generated for the sampled video. Each high-level clip representation corresponds to a respective clip partitioned from the sampled video. When the CBVR system 100 is satisfactorily trained, the high-level clip representation of a given clip should be a representation of that given clip in the representation space (e.g., multi-dimensional vector space) of the video representation.

A high-level clip representation may be generated for a given clip by forward propagating the clip representation corresponding to the given clip and the global video context representation through the video encoder 308 while all other clip representations are zeroed. For example, the high-level clip representation for clip-0 may be generated by forward propagating clip representation-0 and global video context representation through the video encoder 308, and instead of clip representations-1 to -n, zero vectors are forward propagated through the video encoder 308. The resulting output from the video encoder 308 is the high-level clip representation for clip-0, which captures the global context of clip-0 as well as the features of clip-0 (but not the features of clips-1 to -n, except as global context).

At 406, the annotation of the sampled video is processed (e.g., using the text-processing branch 310 of the video representation generator 110) to generate an annotation representation (e.g., a feature vector). Additionally, a set of high-level sentence representations is generated for the annotation. Each high-level sentence representation corresponds to a respective sentence partitioned from the annotation. When the CBVR system 100 is satisfactorily trained, the high-level sentence representation of a given sentence should be a representation of that given sentence in the representation space (e.g., multi-dimensional vector space)

of the annotation representation (which is also the representation space of the video representation).

A high-level sentence representation may be generated for a given sentence by forward propagating the sentence representation corresponding to the given sentence and the global paragraph context representation through the annotation encoder 318 while all other sentence representations are zeroed. For example, the high-level sentence representation for sentence-0 may be generated by forward propagating sentence representation-0 and global paragraph context representation through the annotation encoder 318, and instead of sentence representations-1 to -n, zero vectors are forward propagated to the annotation encoder 318. The resulting output from the annotation encoder 318 is the high-level sentence representation for sentence-0, which captures the global context of sentence-0 as well as the features of sentence-0 (but not the features of sentences-1 to -n, except as global context).

At 408, a respective query representation is generated from each sentence of the annotation of the sampled video. That is, each sentence of the annotation is treated as a word-based query and processed (e.g., using the query encoder 120) to generate a respective query representation.

It may be noted that steps 404-408 may be performed in any suitable order and/or may be performed in parallel.

At 410, a grounding is generated for each query representation. The video representation and each query representation is processed (e.g., using the grounding module 130) to obtain a respective grounding. In the case where the CBVR system 100 is trained to perform video retrieval with temporal grounding, the grounding that is generated may include a coarse clip identifier (e.g., a clip index) and a fine clip identifier (e.g., start and end timestamps of the clip) for the clip corresponding to the query representation.

After the predicted outputs have been generated, the method 400 proceeds to step 412 to compute losses between the predicted outputs and the ground-truth annotation of the sampled video. The computed losses include an alignment loss between the video representation and annotation representation; an alignment loss between each clip representation and corresponding sentence representation; an alignment loss between each high-level clip representation and corresponding query representation; an alignment loss between the query representation and the video representation; a matching loss between each high-level sentence representation and corresponding query representation; and grounding loss. Steps 414-422 may be performed to compute these losses. Each loss may be computed using a respective loss function, which may be defined using any suitable loss metric. For example, an alignment loss may be computed using contrastive loss or a cycle consistency loss, and a matching loss may be computed using KL divergence loss or mean squared error loss. It may be noted that although the loss computations are illustrated as steps 414-422 and in a certain order, the loss computations may be performed in any order and/or in parallel.

At 414, the alignment loss (e.g., a contrastive loss) between the video representation (generated at 404) and the annotation representation (generated at 406) is computed. Computation of this loss enables the video-processing branch 300 and the text-processing branch 310 of the video representation generator 110 to be trained to generate video and annotation representations that correspond to each other and that can be compared in the same, common representation space. This loss may be used to update the parameters of the clip encoder 306 and the sentence encoder 316, as well as those of the video encoder 308 and the annotation encoder 318. This contrastive alignment may train the video representation generator 110 so that, for a sampled video having ground-truth annotation, the cosine similarity between the video representation and the annotation representation is maximized while the cosine similarity between the video representation and a different annotation representation is minimized.

At 416, the alignment loss (e.g., a contrastive loss) between each clip representation (generated as part of generating the video representation) and each corresponding sentence representation (generated as part of generating the annotation representation) is computed (where a clip representation generated from clip-k corresponds to the sentence representation generated from sentence-k). Computation of this loss enables the video-processing branch 300 and the text-processing branch 310 of the video representation generator 110 to be trained to generate clip and sentence representations that correspond to each other and that can be compared in the same, common representation space. It may be noted that this loss may be used to update the parameters of the clip encoder 306 and the sentence encoder 316, but not the video encoder 308 and the annotation encoder 318. The contrastive alignment may train the clip encoder 306 and the sentence encoder 316 to maximize the cosine similarity between clip and sentence representations that correspond to each other, and to minimize the cosine similarity between clip and sentence representations that do not correspond.

At 418, the alignment loss (e.g., a contrastive loss) between each high-level clip representation (generated at 404) and the corresponding query representation (generated at 408) is computed (where the corresponding query representation is the query representation that is generated from sentence-k in the annotation that corresponds to clip-k, and the high-level clip representation is generated for clip-k). Computation of this loss enables the query encoder 120 to be trained to generate query representations that can be compared with video representations in the same, common representation space. It may be noted that this loss may be used only to update the parameters of the query encoder 120 and not the components of the video representation generator 110 (e.g., to avoid instabilities).

At 419, the alignment loss (e.g., a contrastive loss) between the query representation (generated at 408) and the video representation (generated at 404) is computed. Computation of this loss enables the query encoder 120 to be trained to generate query representations that are similar to the video representation (since the query is generated from the annotation of the sampled video, the sampled video should be relevant to the query) in the same, common representation space. It may be noted that this loss may be used only to update the parameters of the query encoder 120 and not the components of the video representation generator 110.

At 420, the matching loss between each high-level sentence representation (generated at 406) and corresponding query representation (generated at 408) is computed (where the corresponding query representation is the query representation that is generated from sentence-k in the annotation, and the high-level clip representation is generated for sentence-k). Computation of this loss enables the query encoder 120 to be trained to generate query representations that capture the high-level (or global) context of a word-based query, even when the query is provided outside the context of a multi-sentence annotation, by mimicking the generation of the high-level sentence representation. Training the query encoder 120 using the matching loss trains the query encoder 120 to maximize the cosine similarity between the query representation that is generated and the corresponding high-level sentence representation. It may be noted that this loss may be used only to update the parameters of the query encoder 120 and not the components of the video representation generator 110 (e.g., to avoid instabilities).

At 422, the grounding loss is computed. Computation of the grounding loss may depend on the design of the grounding module 130 and/or the type of grounding the grounding module 130 is to perform (e.g., temporal grounding, spatial grounding, or spatio-temporal grounding). The grounding loss may include a coarse grounding loss and a fine grounding loss, in examples where the grounding module 130 performs coarse grounding (e.g., predicting the clip index of a relevant clip) and fine grounding (e.g., predicting start and end timestamps of the relevant clip).

For example, if the grounding module 130 is designed to perform temporal grounding using a classifier network with a soft-max output layer to predict the clip index, the coarse grounding loss may be a classification loss (e.g., a cross entropy loss or focal loss computation) and the fine grounding loss may be a regression loss (e.g., a smooth L1 loss may be computed). In another example, if the grounding module 130 uses a clip decoder network without the soft-max output layer, the coarse grounding loss may be a reconstruction loss (that is used to train the grounding module 130 to maximize the cosine similarity between the reconstructed clip representation and the high-level clip representation) and the fine grounding loss may be a regression loss (e.g., a L2 or smooth L1 loss). The coarse grounding loss may be computed between the coarse clip identifier such as a clip index (generated at 410) outputted for a given query representation and the ground-truth index of the corresponding sentence. For example, if a given query representation is generated using sentence-k of the annotation, then the coarse grounding loss may be computed using the index k' outputted by the grounding module 130 and the actual index k of the sentence-k. The fine grounding loss may be computed between the fine clip identifier such as start and end timestamps (generated at 410) outputted for a given query representation and the ground-truth timestamps of the corresponding sentence. For example, if a given query representation is generated using sentence-k of the annotation which has ground-truth timestamps t-k (e.g., ground-truth start and end timestamps denoted t_s-k and t_e-k, respectively), then the fine grounding loss may be computed using the timestamps t_s'-k and t_e'-k outputted by the grounding module 130 and the actual timestamps t_s-k and t_e-k of the sentence-k.

The grounding loss (which may include coarse grounding loss and fine grounding loss) may be used to update the parameters of the grounding module 130 as well as the video representation generator 110 and the query encoder 120.

After the losses have been computed, the method 400 proceeds to step 424 to use the computed losses to update neural network parameters of the CBVR system 100.

At 424, the computed losses are backpropagated through the CBVR system 100 to update the neural network parameters (e.g., the values of the neural network weights) using any suitable machine learning algorithm (e.g., using gradient descent, Adam optimizer, or RAdam optimizer). It should be noted that although the CBVR system 100 is trained end-to-end, not all computed losses are used to update all components of the CBVR system 100, as discussed above.

The method 400 may be repeated over multiple rounds of training until a convergence condition is satisfied, as mentioned above. After the CBVR system 100 has been satisfactorily trained (e.g., the convergence condition is satisfied), the neural network parameters may be fixed and the CBVR system 100 may be used in the inference phase to perform video retrieval together with video grounding. In some examples, the CBVR system 100 may be retrained occasionally or at regular intervals.

After the CBVR system 100 has been satisfactorily trained, the video representation generator 110 may be used to generate video representations for videos stored in the video database 10. Each generated video representation may be labeled with an identifier or reference to the original video and stored in the video representation storage 140. A video representation may be generated for an annotated video by processing the video using the video-processing branch 300 of the video representation generator 110, where the video is partitioned into clips corresponding to the sentences in the annotation and then the clips may be processed as previously described with respect to FIG. 3A. If the video is not annotated (i.e., there is not multi-sentence text description associated with the video), then instead of partitioning into clips based on sentences in an annotation, the video may be evenly partitioned into n clips (where n is the maximum number of clips permitted) and then the clips may be processed as previously described with respect to FIG. 3A.

In some examples, after video representations have been generated for all videos in the video database 10, the video representation generator 110 may no longer be needed in inference and may be made inactive or omitted from the CBVR system 100. In other examples, the video representation generator 110 may be kept as part of the CBVR system 100 so that video representations can be generated and added to the video representation storage 140 as new videos are added to the video database 10. It may be noted that, even if the video representation generator 110 is kept as part of the CBVR system 100, the text-processing branch 310 of the video representation generator 110 may be made inactive or omitted.

Figure 5:
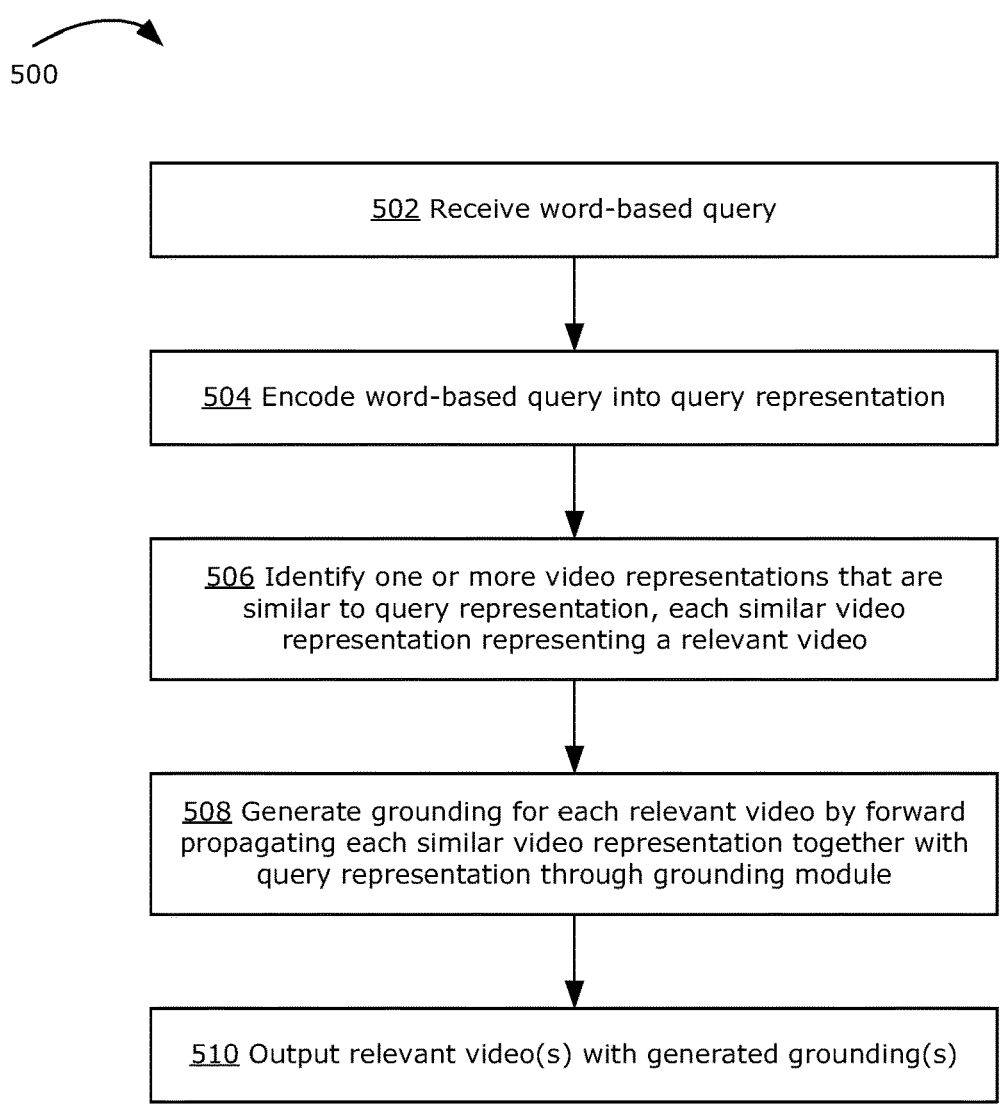
FIG. 5 is a flowchart illustrating an example method for performing video retrieval together with video grounding, in accordance with examples of the present disclosure.

FIG. 5 is a flowchart illustrating an example method 500 for performing video retrieval with video grounding (also referred to as grounded retrieval) using the trained CBVR system 100. The method 500 may be performed by any computing system (e.g., the computing system 200) that is configured for performing computations required for executing a neural network. The computing system that is used to perform the method 500 may or may not be the same computing system that is used to perform the method 400.

At 502, a word-based query for a video is received. The word-based query may be received from an electronic device (e.g., an end user device) in communication with the CBVR system 100 (e.g., over a wireless communication network). The word-based query may be, for example, a single sentence, multiple sentences, one or more phrases, a single word, or a non-grammatical collection of words. The word-based query may be shorter in length (e.g., having fewer words and/or having fewer characters) than conventional multi-sentence video annotations. The word-based query may be in the form of a single sentence, for example (although it is not necessary that the word-based query be a grammatically correct sentence).

At 504, the word-based query is encoded into a query representation. For example, the word-based query may be forward propagated through the trained query encoder 120 of the CBVR system 100. The query encoder 120 may first encode the words in the word-based query into word features (e.g., using the word embedder 322) and then the word features may be encoded (e.g., by the sentence encoder 324) into the query representation. The query encoder 120 has been trained (e.g., using the method 400) such that the generated query representation can be compared with video representations in the same, common representation space (e.g., multi-dimensional vector space) and the query representation captures the implied global context of the word-based query.

At 506, one or more video representations that are similar to the query representation are identified from among a plurality of video representations. The video representations may, for example, have been generated using the trained video representation generator 110 and stored in the video representation storage 140 of the CBVR system 100. Video representations that are similar to the query representation represent videos that are considered to be relevant to the word-based query (also referred to as relevant videos).

Similarity between a video representation and the query representation may be computed using any suitable method for computing similarity between two vectors, such as Euclidean distance or cosine similarity. There may be a predefined number (e.g., ten, five or one) of most similar video representations identified. The video identifier (e.g., video reference or video index) associated with each video representation may also be determined. The video identifier may enable the CBVR system 100 or other electronic device to retrieve the relevant video that is represented by each video representation.

At 508, a grounding is generated for each relevant video. The grounding for a relevant video is generated by forward propagating the video representation representing the relevant video, together with the query representation, through the trained grounding module 130. The grounding generated by the grounding module 130 may be a temporal grounding (e.g., a clip index and/or clip start and end timestamps of the relevant clip in the relevant video), a spatial grounding (e.g., a bounding box of the relevant object in the relevant video), or a spatio-temporal grounding (e.g., a clip index and/or clip start and end timestamps of the relevant clip in the relevant video, and a bounding box of the relevant object in the relevant clip), depending on how the grounding module 130 is designed and trained.

At 510, the one or more relevant videos (represented by the one or more similar video representations identified at 506) with respective generated grounding(s) are outputted. In some examples, the identifier(s) of the relevant video(s) may be outputted instead of the actual relevant video(s) (e.g., an index or reference that can be used to retrieve each relevant video from the video database 10 may be outputted instead of the actual video data file). In other examples, the actual video data file of each relevant video may be retrieved from the video database 10 (e.g., using the video identifier stored with each video representation) and outputted. The output may be provided to the electronic device that was the source of the word-based query received at 502, for example.

The CBVR system 100 may thus enables grounded video retrieval, using a word-based query that can be shorter than a conventional multi-sentence video annotation and that can be non-grammatical (e.g., a single word, or a non-grammatical collection of words). However, the CBVR system 100 as disclosed may also support multi-sentence queries.

In the above discussion, examples have been described in the context of performing temporal grounding with video retrieval. However, the present disclosure may also encompass examples that perform spatial grounding or spatio-temporal grounding with video retrieval.

For example, the CBVR system 100 may be configured to perform spatio-temporal grounding with video retrieval by adapting the design of the video representation generator 110 and grounding module 130. In the video-processing branch 300 of the video representation generator 110, each clip may be processed using a pre-trained object detector neural network as well as the clip feature extractor 304) so that the frame features include spatial features (e.g., object specific features, such as object index, object bounding box, object classification, etc.). For example, the clip feature extractor 304 may, in addition to or as part of the pre-trained feature extraction neural network (e.g., a pre-trained deep CNN) described previously, include a pre-trained object detection neural network. For example, the clip feature extractor 304 may make use of the pre-trained object detection neural network excluding the final output layer (i.e., using the features from the penultimate layer). The input to the pre-trained object detection neural network is a frame feature, and the features outputted by the penultimate layer of the pre-trained object detection neural network are processed by a transformer that takes in the centroid of the bounding box and outputs an object summary for each frame feature (e.g., similar to positional encoding of vision transformers as described by Dosovitskiy et al. "An Image is Worth 16×16 Words: Transformers for Image Recognition at Scale", arXiv: 2010.11929).

The clip feature extractor 304 may extract object specific features and further process the object features using a transformer and aggregate the object features based on attention. The resulting object summary feature may be added (e.g., concatenated) with the frame features that are generated as discussed previously. The set of frame features for the clip may then be processed by the clip encoder 306 and the video encoder 308 as described previously, to obtain the video representation.

The video representation generator 110 may be trained such that the spatial features are aligned with the word features corresponding to a relevant object (where a relevant object is an object that corresponds to a word (e.g., a noun) in the sentence describing the clip). For example, training the video representation generator 110 may involve fine-tuning the penultimate layer of the pre-trained object detection neural network together with the final output layer of the pre-trained word embedder using a contrastive alignment loss between object and word features. Any words that are not nouns may be masked (e.g., by zeros).

Figure 3D:
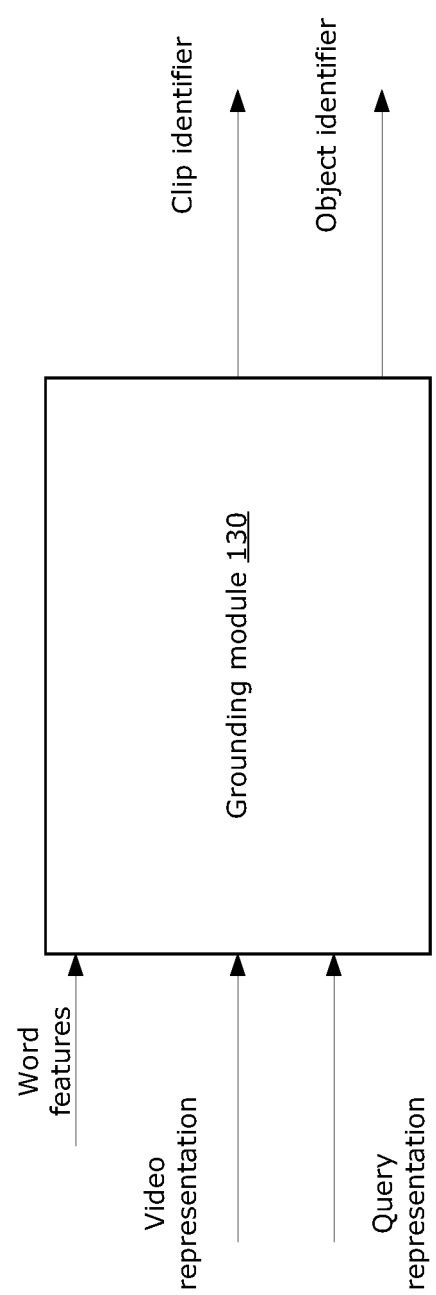

FIG. 3D is a block diagram illustrating an example of how the grounding module 130 may be configured for spatio-temporal grounding. The grounding module 130 may be designed and trained to generate both temporal grounding (e.g., clip index and/or start and end timestamps) together with spatial grounding (e.g., object index and/or bounding box of object) using word features in addition to the video representation and query representation as inputs. Spatial grounding may include coarse grounding (e.g., object index of the relevant object) and/or fine grounding (e.g., bounding box of the relevant object).

To perform spatio-temporal grounding, the video representation generator 110 is also trained to extract object features as part of the frame features (as described above). The grounding module 130 is trained using a reconstruction loss as the coarse grounding loss, with the goal of maximizing the similarity between ground-truth object features and reconstructed object features from reconstructed clip features. For fine grounding loss, a regression loss is computed (similar to the find grounding loss for temporal grounding).

Training the grounding module 130 to perform fine grounding (e.g., predict the bounding box of a relevant object) is now described. Cross-attention is first computed between a word feature (from a ground-truth sentence) and the reconstructed object features (from the clip representation corresponding to the ground-truth sentence). The output of the cross-attention computation is a feature vector that can be used to predict the bounding box. It may be noted that both the sentence and word representation of a noun are used to perform spatial grounding. The sentence representation is used to predict the corresponding clip index in order to reconstruct the object features in the clip. A cosine similarity based matching of object feature with the word feature is used to predict the object index of the relevant object and cross-attention computation is used to predict the bounding box of the relevant object.

The grounding module 130 may be trained to perform spatial grounding by, for example, training the grounding module 130 to predict an object identifier (which may include coarse identifier, such as an object index, and/or fine identifier, such as an object bounding box) from word features generated by the word embedding 322 of the query encoder 120, using an annotated training dataset. For example, an annotated video sampled from the training dataset may have labeled objects (e.g., each object having an assigned object index and bounding box) that correspond to a given sentence in the annotation. Then, the grounding module 130 may be trained using reconstruction loss and regression loss computed between the reconstructed object index and bounding box, and the ground-truth object index and bounding box for the given sentence.

The grounding module 130 may be trained in this way to reconstruct the object features for a relevant clip. For coarse spatial grounding, cosine similarity based matching may be used to match the reconstructed object features with the word feature (from the word embedder 322 of the query encoder 120) to generate the object index of the relevant object. For find spatial grounding, cross attention between the word feature and the object features of the clip may be performed, then the result aggregated and used to generate the bounding box of the relevant object.

In various examples, the present disclosure has described systems and methods for performing video retrieval together with video grounding. The grounded video retrieval may be performed using a word-based query that is shorter than a multi-sentence query that may be required in some conventional video retrieval systems. This may enable more practical, real-life applications because it is more practical that a user would provide shorter (e.g., single sentence, single phrase, single word, etc.) search queries.

Further, the disclosed systems and methods may provide improved efficiency because only video representations need to be stored and searched (rather than clip representations). For example, if there are v number of videos and c number of clips per video, only v video representations need to be stored instead of v*c clip representations, thus greatly improving storage efficiency (e.g., saving memory resources). As well, during retrieval, only v video representations need to be searched to find video representation(s) that are similar to the query representation instead of having to search v*c clip representations, thus greatly improving efficiency during inference (e.g., saving processing time and processor power).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
receiving a word-based query for a video;
encoding the word-based query into a query representation using a trained query encoder;
performing a video retrieval task by identifying, from among a plurality of video representations each representing a respective untrimmed video, one or more similar video representations that are similar to the query representation, each similar video representation representing a respective relevant video;
performing a video grounding task by generating a grounding for each relevant video by forward propagating each respective similar video representation together with the query representation through a trained grounding module, each respective similar video representation being used for both the video retrieval task and the video grounding task; and
outputting one or more identifiers of the one or more relevant videos together with the grounding generated for each relevant video;
wherein each of the plurality of video representations is generated using a trained video representation generator; and
wherein the video representation generator is trained together with the query encoder using a training dataset of videos having ground-truth multi-sentence annotations, the query encoder being trained to generate a query representation from a given sentence in a given annotation that matches a high-level sentence representation generated by a text-processing branch of the video representation generator from the given sentence and the query representation generated from the given sentence in the given annotation aligns with a high-level clip representation generated by a video-processing branch of the video representation generator from a clip corresponding to the given sentence.

2. The method of claim 1, wherein the query representation and the video representation are in a common representation space, and wherein identifying the one or more similar video representations comprises:
   computing a similarity between the query representation and each video representation stored in a video representation storage; and
   identifying a defined number of video representations having a highest computed similarity to the query representation.

3. The method of claim 1, wherein each video representation is generated using the video-processing branch of the video representation generator by:
   processing each clip of a video using a clip feature extractor to generate a set of frame features;
   processing each set of frame features using a clip encoder to generate a respective clip representation, and processing all the sets of frame features using the clip encoder to generate a global video context representation; and
   processing all clip representations and the global video context representation using a video encoder to generate the video representation.

4. The method of claim 3, wherein the video-processing branch processes the video into two or more clips prior to processing each clip.

5. The method of claim 1, wherein the grounding generated for each relevant video includes at least one of: a clip index of a relevant clip in the relevant video; start and end timestamps of the relevant clip; or a bounding box of a relevant object in the relevant video.

6. The method of claim 5, wherein the grounding generated for each relevant video includes the clip index of the relevant clip in the relevant video, and wherein the grounding module comprises a classifier network or clip decoder network for predicting the clip index of the relevant clip using the query representation and the similar video representation as inputs.

7. The method of claim 5, wherein the grounding generated for each relevant video includes the start and end timestamps of the relevant clip in the relevant video, and wherein the grounding module comprises a regression network for predicting the start and end timestamps of the relevant clip using the query representation and the similar video representation as inputs.

8. The method of claim 1, wherein the word-based query is a single sentence, multiple sentences, one or more phrases, a single word, or a non-grammatical collection of words.

9. A system comprising:
   one or more processors configured to execute instructions to cause the system to:
      receive a word-based query for a video;
      encode the word-based query into a query representation using a trained query encoder;
      perform a video retrieval task by identifying, from among a plurality of video representations each representing a respective untrimmed video, one or more similar video representations that are similar to the query representation, each similar video representation representing a respective relevant video;
      perform a video grounding task by generating a grounding for each relevant video by forward propagating each respective similar video representation together with the query representation through a trained grounding module implemented using a trained neural network, each respective similar video representation being used for both the video retrieval task and the video grounding task; and
      output one or more identifiers of the one or more relevant videos together with the grounding generated for each relevant video;
   wherein each of the plurality of video representations is generated using a trained video representation generator; and
   wherein the video representation generator is trained together with the query encoder using a training dataset of videos having ground-truth multi-sentence annotations, the query encoder being trained to generate a query representation from a given sentence in a given annotation that matches a high-level sentence representation generated by a text-processing branch of the video representation generator from the given sentence and the query representation generated from the given sentence in the given annotation aligns with a high-level clip representation generated by a video-processing branch of the video representation generator from a clip corresponding to the given sentence.

10. The system of claim 9, wherein the query representation and the video representation are in a common representation space, and wherein identifying the one or more similar video representations comprises:
   computing a similarity between the query representation and each video representation stored in a video representation storage; and
   identifying a defined number of video representations having a highest computed similarity to the query representation.

11. The system of claim 9, wherein the video-processing branch of the video representation generator comprises:
   a clip feature extractor configured to generate a set of frame features for each clip of a video;
   a clip encoder configured to generate a clip representation from the set of frame features of each clip, and to generate a global video context representation from all the sets of frame features; and
   a video encoder configured to generate the video representation of the video from all clip representations and the global video context representation.

12. The system of claim 9, wherein the grounding generated for each relevant video includes at least one of: a clip index of a relevant clip in the relevant video; start and end timestamps of the relevant clip; or a bounding box of a relevant object in the relevant video.

13. The system of claim 12, wherein the grounding generated for each relevant video includes the clip index of the relevant clip in the relevant video, and wherein the grounding module comprises a classifier network or clip decoder network for predicting the clip index of the relevant clip using the query representation and the similar video representation as inputs.

14. The system of claim 12, wherein the grounding generated for each relevant video includes the start and end timestamps of the relevant clip in the relevant video, and wherein the grounding module comprises a regression network for predicting the start and end timestamps of the relevant clip using the query representation and the similar video representation as inputs.

15. The system of claim 9, wherein the word-based query is a single sentence, multiple sentences, one or more phrases, a single word, or a non-grammatical collection of words.

16. The system of claim 9, wherein the video representation generator includes the text-processing branch during training, and the text-processing branch is inactive or omitted after training.

17. The system of claim 9, wherein the video representation generator is active in the system for generating the plurality of video representations and is inactive or omitted from the system after generating the plurality of video representations.

18. A non-transitory computer readable medium having instructions encoded thereon, wherein the instructions, when executed by one or more processors of a system, cause the system to:

receive a word-based query for a video;

encode the word-based query into a query representation using a trained query encoder;

perform a video retrieval task by identifying, from among a plurality of video representations each representing a respective untrimmed video, one or more similar video representations that are similar to the query representation, each similar video representation representing a respective relevant video;

perform a video grounding task by generating a grounding for each relevant video by forward propagating each respective similar video representation together with the query representation through a trained grounding module, each respective similar video representation being used for both the video retrieval task and the video grounding task; and output one or more identifiers of the one or more relevant videos together with the grounding generated for each relevant video;

wherein each of the plurality of video representations is generated using a trained video representation generator; and wherein the video representation generator is trained together with the query encoder using a training dataset of videos having ground-truth multi-sentence annotations, the query encoder being trained to generate a query representation from a given sentence in a given annotation that matches a high-level sentence representation generated by a text-processing branch of the video representation generator from the given sentence and the query representation generated from the given sentence in the given annotation aligns with a high-level clip representation generated by a video-processing branch of the video representation generator from a clip corresponding to the given sentence.

19. The non-transitory computer readable medium of claim 18, wherein the query representation and the video representation are in a common representation space, and wherein identifying the one or more similar video representations comprises:

computing a similarity between the query representation and each video representation stored in a video representation storage; and identifying a defined number of video representations having a highest computed similarity to the query representation.

20. The non-transitory computer readable medium of claim 18, wherein each video representation is generated using the video-processing branch of the video representation generator by:

processing each clip of a video using a clip feature extractor to generate a set of frame features;

processing each set of frame features using a clip encoder to generate a respective clip representation, and processing all the sets of frame features using the clip encoder to generate a global video context representation; and processing all clip representations and the global video context representation using a video encoder to generate the video representation.

* * * * *